Aug. 4, 1970    M. TIERMAN ETAL    3,523,221
BI-METAL THIN FILM COMPONENT AND BEAM-LEAD THEREFOR
Filed May 7, 1968
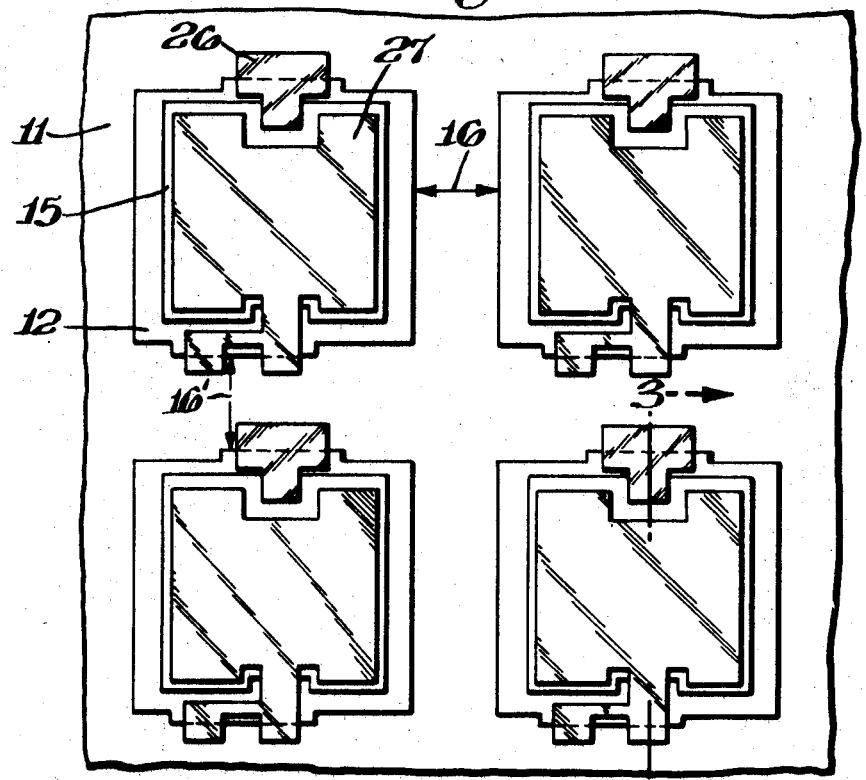
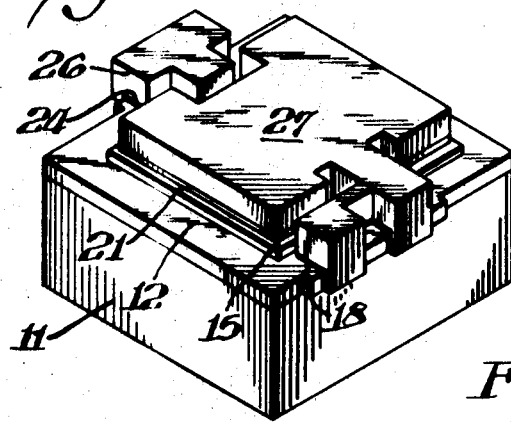
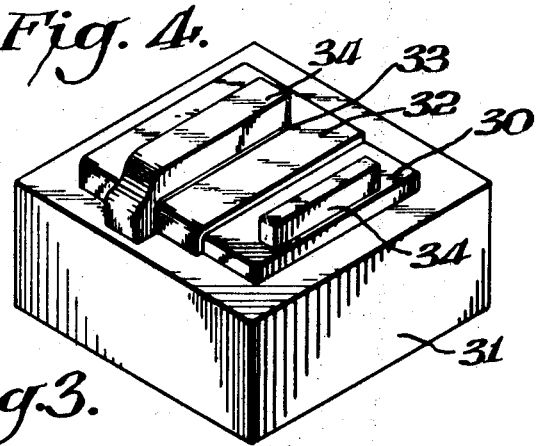
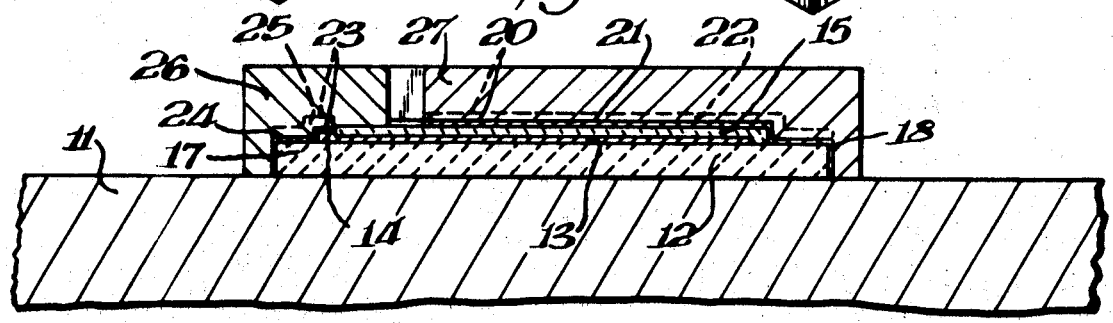

United States Patent Office

3,523,221
Patented Aug. 4, 1970

3,523,221
BI-METAL THIN FILM COMPONENT AND BEAM-LEAD THEREFOR
Melvin Tierman, North Adams, and William E. Wesolowski, Adams, Mass., assignors to Sprague Electric Company, North Adams, Mass., a corporation of Massachusetts
Filed May 7, 1968, Ser. No. 727,159
Int. Cl. H01g 9/05, 3/075
U.S. Cl. 317—230                         11 Claims

ABSTRACT OF THE DISCLOSURE

A thin film capacitor having a counterelectrode of an extremely thin layer of chromium overlaid by gold is provided with beam-lead electrode connections resulting in a capacitor with improved mechanical and electrical properties.

BACKGROUND OF THE INVENTION

This invention relates to thin film capacitors and more particularly to a thin film capacitor having a valve metal electrode, a dielectric oxide of said electrode, a chromium-gold counterelectrode, and beam lead connections to the electrodes.

A problem in the formation of the thin film capacitors (including tantalum, hafnium, aluminum, zirconium and niobium) has been the formation of the counterelectrode. Two basic thin film capacitor types can be classified in terms of their counterelectrodes being non-adherent or adherent. In the non-adherent type, a unit comprises a dielectric oxide of the thin film valve metal electrode sandwiched between the electrode and a metal counterelectrode, usually gold because of its excellent electrical properties. This unit, however is subject to mechanical breakdown because of poor adhesion of the counterelectrode, and is also humidity sensitive because of moisture penetration to the interface of the dielectric and the poorly adherent counterelectrode. These deficiencies exclude the unit from many applications. The adherent type was designed to improve the mechanical properties of the unit by correcting the above deficiencies, and in this sense succeeded. The counterelectrode was composed of a "thin" layer (over 200 angstroms) of chromium, nichrome or titanium followed by the gold. The added metal lent adherence properties to the counterelectrode but had the undesired effect of degrading electrical properties, i.e. the breakdown voltage decreased and leakage current increased thereby lowering yield. It is therefore one object of the invention to provide a thin film capacitor of the adherent counterelectrode type which maintains the capacitors' electrical properties while effecting the desired mechanical improvements.

Another traditional problem with thin film capacitors in common with other components and circuits, is the lead bonding process. Bonding with wire is time consuming and therefore costly. A promising technique, flip chip bonding, requires a closely controlled substrate planarity and a demanding inspection procedure to determine whether adequate bonding has been achieved at all contacts.

The most hopeful solution to the lead bonding problem has been in the use of beam leads; electroformed electrodes cantilevered beyond the edges of the component. The use of wire is completely eliminated making the bonding operation simpler and less expensive; the beams are visible permitting accurate registration and the bonding of all leads simultaneously.

Beam lead technology has become well defined in the fabrication of semiconductor devices and integrated circuits. The present state of the art permits batch fabrication of low-cost, highly reliable semiconductor devices and integrated circuits together with their connections and encapsulations. However, the present technology has not been applied to passive components, and in particular to thin film capacitors. It is therefore another object of this invention to provide an improved capacitor as described above with beam lead interconnections. It is a further object to provide for batch fabrication of such beam-leaded capacitors.

SUMMARY OF THE INVENTION

The present invention is a thin film capacitor formed on a silicon substrate and having beam leads attached thereto. In the preferred embodiment, the electrode is tantalum, a metal easily deposited by a sputtering process and forming capacitors with a wide variety of physical and electrical characteristics. The counterelectrode is an extremely thin layer of chromium (20–200 angstroms) followed by gold. The chromium layer provides the adhesion necessary to improve the mechanical properties of the capacitor and its extreme thinness makes the properties of the overlying gold layer dominant, thereby maintaining the excellent electrical properties of that metal. The capacitors may be formed on a silicon substrate instead of the usual glass or ceramic. This permits batch fabrication of the capacitors and allows a variant of the known beam leading process to be used.

BRIEF DESCRIPTION OF THE DRAWINGS

FIG. 1 is a partial view of a substrate showing four unseparated capacitors;

FIG. 2 shows a perspective view of a completed capacitor;

FIG. 3 is a cross-section view of the capacitor through line 3—3 of FIG. 1;

FIG. 4 shows a individual capacitor formed without beam lead connections on a glass or ceramic substrate.

DESCRIPTION OF THE INVENTION

Briefly, in accordance with the present invention, the beam leaded capacitor is formed by sputtering a thin film of tantalum onto an oxidized silicon substrate. The tantalum pattern is formed by the usual photolithographic techniques. The pattern is electrically interconnected and electrochemically anodized to form the pentoxide dielectric layer. The silicon dioxide layer is defined by etching, and an electrode base is formed by evaporating a barely continuous layer of chromium followed by gold. More gold is electroplated over the electrode and beam area to form the beam leads. The thin interconnecting chromium-gold is removed by etching. The silicon wafer is then thinned to its final thickness and the underside of the beams fully exposed by etching the silicon.

While this procedure may be performed on a single chip, economy of operation practically dictates batch fabrication of these capacitors. Hence, the following more detailed description describes a plurality of tantalum capacitors formed on a silicon wafer.

FIG. 1 shows four representative unseparated capacitor units out of up to 900 that are formed on a polished silicon wafer 1⅜″ in diameter. FIG. 2 shows a separated capacitor and FIG. 3 shows the capacitor in cross section. Referring to these figures, a silicon wafer 11, originally 7 mils thick, has been oxidized to form a silicon dioxide layer 12 approximately 10,000 angstroms thick. This dioxide layer serves to isolate the capacitor devices from the silicon. The tantalum electrodes are formed by sputtering a film 13 of tantalum 3000 to 4000 angstroms thick over the entire silicon dioxide surface and then etching the tantalum through a photoresist mask to obtain the desired isolation pattern. A thin layer of aluminum is subsequently evaporated over the entire surface, followed by photoresist masking and etching to provide an aluminum pattern which electrically interconnects, in parallel, the isolated tantalum electrodes and also masks the beam lead to electrode contact area 14. The wafer is then anodized at an anodization voltage of 190 volts to form a layer of tantalum pentoxide 15, after which the aluminum and its anodic oxide are etched away. Film 15 has a thickness of 2850 angstroms resulting in a decrease of approximately 1425 angstroms of the tantalum film.

At this point channels 16 which will be cut through the substrate to physically separate the individual capacitors are partially defined by masking and etching away the outer portions of the silicon dioxide layer 12 using a buffered hydrofluoric acid solution. The channels are shown with exaggerated widths for clarity purposes. The usual procedure for forming channel patterns in batch fabrication of semiconductors and integrated circuits is to completely form the unit on the substrate face; then turn the unit over and etch away first the silicon and then the silicon dioxide in the desired locations. Severe interfacial stresses cause damaged units and reduced yield. It has been found that separating these two etching steps greatly reduces the strains to which each layer was previously subject and improves yield up to 50%. The silicon is still etched after the units have been formed (as described later in this specification).

A further change has been made in the usual channel definition. Channel 16' has been intentionally narrowed by leaving the silicon dioxide layer 12 wider than the width of the silicon layer 11 in beam lead support areas 17 and 18. This silicon dioxide "overhang" provides better isolation of the counterelectrode from the silicon and reduces moisture-bridging of the electrodes to the silicon wafer.

It is to be noted that the silicon dioxide etch at this point removes the electrical isolation between units; hence there can be no testing until final channeling. The yield for this embodiment has been found sufficiently high so that the lack of testing was not a serious problem. If desired however, the above-described stress abbreviation can be effected while providing for testing by partially etching the silicon dioxide at this point, leaving a continuous, though thinner layer to maintain insulation between beams. Stress relief is achieved by completely etching a narrow channel between beams. The remaining thin silicon dioxide can later be removed following the silicon etch.

The capacitor is completed by formation of the counterelectrode and the beam leads in interrelated steps. A barely continuous layer of chromium, 80 angstroms thick is evaporated over all exposed surfaces followed by a layer of gold approximately 1000 angstroms thick. A chromium gold etch performed in a later step results in the formation of counterelectrode 20 comprising a chromium base layer 21 and gold layer 22 and also a beam lead base 23 comprising chromium base layer 24 and gold layer 25. This chromium-gold layer serves several important purposes: The chromium disposed over tantalum pentoxide layer 15 is so thin that it does not penetrate that layer, but adheres to it forming a base to which the following gold tightly adheres while the gold alloys into the chromium so the layer's electrical characteristics are essentially that of gold; therefore, the 415 mil² counterelectrode 20 thus formed has mechanical and electrical properties superior to that of a capacitor having no adherent base or a base of greater thickness (the improvement in yield over the latter type capacitor is in the order of 50%). Base 23 provides an adherent and highly compatible base for the electroforming of the beam leads in the ensuing step and, finally, the chromium-gold layers electrically connect the isolated areas of the wafer during the electroforming process. The above results have been maintained using a chromium layer ranging in thickness from 20 to 200 angstroms. Although chromium is the preferred base layer, Nichrome, titanium and manganese oxide layers of the indicated thickness have been used with success.

The beam leads 26 and 27 are formed by electroplating gold to a ¼ to ½ mil thickness over base 23 and counterelectrode 20, respectively. Beam 27 is notched to designate negative polarity but any other marking system can be used for that purpose. Although lead 27 is shown equally plated over the entire surface of counterelectrode 20, it is only necessary that the beam and its anchorage be plated to full thickness. The thin interconnecting chromium-gold layer is then etched away.

The wafer is turned over at this point so that the undersides of the beams can be fully exposed (the silicon dioxide has already been etched away) and the wafer thinned and separated into individual capacitors. The wafer is mounted on a suitable mounting block and thinned chemically to 2 mils. After the appropriate photoresist mask has been applied to the back, the channels are completely etched through following the pattern already delineated through the silicon dioxide on the face surface. The mask may be aligned by any available methods such as infra-red transmission or reflection. The chromium, now accessible on the underside of the beams, is etched away. Since the channeling process physically separates the individual units, it is desirable to use a wax film on the wafer surface to maintain adhesion until a later separation process.

Typical characteristics of capacitor units fabricated by the above process are as follows: capacitance of 173 pf. and a dissipation factor of 0.3% at a frequency of 1 kHz. and at room temperature; capacitance of 172 pf. and a dissipation factor of 0.4% at a frequency of 100 mHz. and at room temperature; leakage current of $4.0 \times 10^{-13}$ amp at 50 vdc and room temperature; breakdown voltage 160–190 volts when beam contact to the Ta electrode is positive and a breakdown voltage of 140–175 volts when beam contact to the Ta electrode is negative, and a temperature coefficient of capacitance of 170 to 230 p.p.m./° C. in the emperature range of —55 to 125° C.

The basic capacitor unit formed individually without the beam leads is shown in FIG. 4. A film of tantalum 30 is formed on substrate 31, preferably glass or ceramic. The tantalum pentoxide layer 32 is anodically formed and the chromium layer 33 20 to 200 angstroms thick followed by gold 34 forms the counter-electrode. Units assembled on these substrates have demonstrated the improved electrical characteristics with mechanical strength associated with the thin chromium gold layer.

Since it is obvious that many changes and modifications can be made in the above-described details without departing from the nature and spirit of the invention it is to be understood that the invention is not limited to said details except as set forth in the appended claims.

What is claimed is:
1. An electrical capacitor comprising
an insulating substrate;
a first electrode of a valve metal deposited as a thin film on said substrate;
a dielectric layer of tthe oxide of said valve metal formed on the surface of said first electrode;
a second electrode of gold formed on the surface of said dielectric layer;
a first gold beam lead attached to a contact area of said first electrode and a second gold beam lead attached to said second electrode;
both beam leads being supported by the substrate and cantilevered beyond its edges.
2. An electrical capacitor as described in claim 1 wherein said substrate is silicon oxidized to form a layer of silicon dioxide on its surface, said first electrode is a valve metal selected from the group consisting of tantalum, hafnium, aluminum, zirconium and niobium, and said second electrode comprises a film of chromium 20 to 200 angstroms thick followed by a layer of gold.

3. An electrical capacitor as described in claim 2 including a film of chromium 20 to 200 angstroms thick formed on that surface of the substrate which supports those portions of the beam leads lying between the edge of the substrate and the electrode contact areas.

4. An electrical capacitor as described in claim 4 wherein the silicon dioxide layer extends further than the underlying silicon layer at the edges beyond which the beam leads extend.

5. An electrical capacitor as described in claim 4 wherein the film which forms the base of the second electrode and which also covers that surface of the substrate which supports those portions of the beam leads lying between the edges of the substrate and the electrode contact areas is selected from the group consisting of Nichrome, titanium, and manganese oxide.

6. An electrical capacitor comprising
   an insulating substrate
   a first electrode of a valve metal selected from the group consisting of tantalum, hafnium, aluminum, zirconium and niobium deposited as a thin film on said substrate;
   a dielectric layer of the oxide of said valve metal formed on the surface of said first electrode;
   a second electrode comprising a film of chromium 20 to 200 angstroms thick adhering to said dielectric layer, a layer of gold adhering to said film of chromium and electrode terminal means connected to each of said electrodes.

7. An electrical capacitor as described in claim 6 wherein said insulating substrate is selected from the group consisting of glass or ceramic.

8. An electrical capacitor as described in claim 6 wherein said second electrode comprises a film of Nichrome 20 to 200 angstroms thick followed by a layer of gold.

9. An electrical capacitor as described in claim 6 wherein said second electrode comprises a film of manganese oxide 20 to 200 angstroms thick followed by a layer of gold.

10. A method of batch-fabricating a beam-leaded capacitor including the steps of:
    oxidizing the surface of a silicon wafer to form a layer of silicon dioxide;
    sputtering and defining a thin film of a valve metal onto selected areas of the silicon dioxide surface;
    electrically connecting the isolated valve metal films;
    anodizing the metal films to form a layer of the oxide channel etching through the silicon dioxide;
    evaporating a layer of chromium-gold over the valve metal oxide and silicon dioxide surface;
    plating gold over selected surfaces of the chromium gold layer so as to form cantilevered beam leads attached at one unit to an electrode with the other end extending over the edge of the silicon dioxide;
    thinning of the silicon wafer; and
    channel etching of the silicon wafer, said etching creating a channel wider than that defined by the silicon dioxide in the areas directly under the ends of the beam leads.

11. An electrical component comprising a substrate of silicon having a layer of silicon dioxide on one surface; an electrode comprising a valve metal deposited as a thin film on said silicon dioxide; and a chromium gold beam lead attached to said electrode, said beam lead being supported by said substrate and cantilevered beyond its edge.

References Cited

UNITED STATES PATENTS

| | | | |
|---|---|---|---|
| 3,028,447 | 4/1962 | Flaschen et al. | 317—230 X |
| 3,257,592 | 6/1966 | Maissel | 317—258 |
| 3,335,338 | 8/1967 | Lepselter | 317—234 |
| 3,381,256 | 4/1968 | Schuller et al. | 338—309 |
| 3,445,727 | 5/1969 | Maple | 317—101 |
| 2,993,266 | 7/1961 | Berry | 29—25.42 |

JAMES D. KALLAM, Primary Examiner

U.S. Cl. X.R.

317—238, 261

PO-1050
(5/69)

UNITED STATES PATENT OFFICE
CERTIFICATE OF CORRECTION

Patent No. 3,523,221      Dated August 4, 1970

Inventor(s)      Melvin Tierman et al

It is certified that error appears in the above-identified patent and that said Letters Patent are hereby corrected as shown below:

Column 4, line 37, after "age" insert -- of --
      Column 4, line 41, change "emperature" to
-- temperature --
      Column 4, line 62, change "tthe" to -- the --
      Column 5, line 30, after "ium" insert a comma
      Column 6, line 8, after "oxide" insert -- of each metal on each surface; --

SIGNED AND
SEALED
OCT 20 1970

(SEAL)
Attest:

Edward M. Fletcher, Jr.
Attesting Officer

WILLIAM E. SCHUYLER, JR.
Commissioner of Patents